(12) United States Patent
Capristo

(10) Patent No.: US 8,371,158 B2
(45) Date of Patent: Feb. 12, 2013

(54) POWER BASED FIELD TESTING OF DIESEL ENGINES

(76) Inventor: Francis Jay Capristo, Titusville, PA (US)

( * ) Notice: Subject to any disclaimer, the term of this patent is extended or adjusted under 35 U.S.C. 154(b) by 318 days.

(21) Appl. No.: 12/714,593

(22) Filed: Mar. 1, 2010

(65) Prior Publication Data

US 2011/0209534 A1 Sep. 1, 2011

Related U.S. Application Data

(60) Provisional application No. 61/208,943, filed on Mar. 2, 2009.

(51) Int. Cl.
*G01M 15/04* (2006.01)
(52) U.S. Cl. ................................ 73/114.52
(58) Field of Classification Search ............ 73/114.52
See application file for complete search history.

(56) References Cited

U.S. PATENT DOCUMENTS

| | | | | |
|---|---|---|---|---|
| 3,960,012 | A | 6/1976 | Ingram | 73/136 |
| 3,972,224 | A | 8/1976 | Ingram | 73/114 |
| 4,286,324 | A | 8/1981 | Ingram | 364/442 |
| 4,334,425 | A | 6/1982 | Crane | 73/112 |
| 4,870,585 | A * | 9/1989 | Manzolini | 701/101 |
| RE33,450 | E * | 11/1990 | Manzolini | 701/101 |
| 5,214,916 | A * | 6/1993 | Lukich | 60/431 |
| 6,085,583 | A | 7/2000 | Cannon et al. | 73/149 |
| 6,191,732 | B1 | 2/2001 | Carlson et al. | 342/357.06 |
| 7,596,418 | B2 | 9/2009 | Bugosh | 700/98 |
| 8,078,441 | B2 * | 12/2011 | Greiner et al. | 703/7 |
| 8,095,279 | B2 * | 1/2012 | Greiner et al. | 701/50 |
| 8,099,217 | B2 * | 1/2012 | Greiner et al. | 701/50 |
| 2007/0175271 | A1 * | 8/2007 | Pividori et al. | 73/113 |
| 2009/0063031 | A1 * | 3/2009 | Greiner et al. | 701/117 |
| 2009/0099708 | A1 * | 4/2009 | Greiner et al. | 701/1 |

* cited by examiner

*Primary Examiner* — Freddie Kirkland, III
(74) *Attorney, Agent, or Firm* — Kratz, Quintos & Hanson, LLP

(57) ABSTRACT

A method for accurately determining fuel efficiency in diesel engines of vehicles, as they exist on the job. In determining the efficiency, work done by the vehicle in combination with accurately measured fuel consumption enables calculation of the fuel efficiency of the vehicle. The method of the invention is of use in determining a baseline fuel efficiency for use in evaluating the effectiveness of fuel efficiency related improvements to the engine or vehicle. Following making the improvements, additional fuel efficiency tests using the method of the invention are carried out for comparing the new fuel efficiency with the baseline fuel efficiency. In some applications GPS systems are used for determining work done by the vehicle.

4 Claims, No Drawings

POWER BASED FIELD TESTING OF DIESEL ENGINES

This application claims priority of U.S. Provisional Application No. 61/208,943 filed Mar. 2, 2009.

FIELD OF THE INVENTION

The present invention is concerned with providing an accurate measurement of fuel consumption and exhaust emissions in diesel powered vehicles, as they exist on the job. Diesel powered vehicles having both mechanical drive systems and electrical drive systems are of concern.

BACKGROUND OF THE INVENTION

Improving the fuel efficiency of diesel engines, used in machinery of all types, can result in substantial saving in fuel costs for the operator. Known fuel efficiency tests conducted in the field relate fuel consumption and emissions to Units of Time or Distance (i.e. gallon/hour or miles/gallon), rather than gallons/horsepower or gallons/kilowatt hour. However, tests conducted that are based on actual delivered horsepower eliminate many of the variables, that when unaccounted for, negatively impact the accuracy of results. For example, in determining the fuel efficiency of a diesel engine in a towboat, the variables might be wind, water current, etc.

OBJECT OF THE INVENTION

The objective of the present invention is to provide an accurate measurement of fuel consumption and exhaust emissions in relation to both the power available to do work as well as, in some instances, the amount of "work done" in diesel powered vehicles, as they exist on the job. To this end, a method of measuring, collecting and logging data associated with the actual power available to do work as well as the actual work done are disclosed. Both the accurately measured power available and work done are then correlated to the amount of fuel consumed, as well as the emissions produced, during the same period of time.

The present method of testing is especially valuable when a baseline test is conducted and later verification or comparison tests are performed. Typically, in an effort to improve fuel efficiency, a change is made to the diesel engine after baseline data is established. These changes might be of mechanical settings within the engine, grades of fuel, fuel additives or treatments, oil treatments, etc. The comparison of results, from one test to the next, identifies the impact of the changes made, with extreme accuracy. The present test methods accomplish this by correlating the power available to do work or actual work done, to fuel consumption and emissions. The present method minimizes many of the variables that reduce the accuracy of known comparison tests, based upon time or distance, and the inconsistent results they typically provide.

SUMMARY OF THE INVENTION

The present invention is a method for determining efficiency of fuel consumption in an internal combustion engine powered vehicle, by measuring RPM's of a drive shaft of the vehicle every X second for a period of Y seconds and determining an average RPM; measuring a torque value of the drive shaft of the vehicle every X seconds for a period of Y seconds and determining an average torque; measuring fuel consumption of the engine every X second for a period of Y seconds and determining an average fuel consumption; and calculating a horsepower of the drive shaft of the vehicle as ((average torque)(average RPM))/(5252)=(HP), and calculating efficiency of fuel consumption as (average fuel consumption)/(HP).

A second embodiment of the invention is a method for determining efficiency of fuel consumption in an internal combustion engine powered vehicle operating at a constant gross weight, by 1) measuring the vehicle's speed, direction of movement and elevation change every X second for a period of Y seconds with use of a GPS tracking software system; 2) calculating work done over the Y seconds with use of measurements obtained in step 1) and a gross weight of the vehicle; 3) measuring fuel consumption of the engine every X second for a period of Y seconds and determining an average fuel consumption; and 4) calculating fuel consumption efficiency based on work done over the period of Y seconds divided by the average fuel consumption by the engine over the period of Y seconds.

A third embodiment of the invention is a method for determining efficiency of fuel consumption in an internal combustion engine powered vehicle, during operation of the vehicle within a site to excavate material from the site, wherein the vehicle has a base weight and material from the site loaded and unloaded on the vehicle varies a gross weight and resistive load of the vehicle, by 1) measuring the vehicle's speed, direction of movement and elevation change every X second for a period of Y seconds with use of a GPS tracking software system; 2) calculating a first work done with use of measurements obtained in step 1) and the vehicle's base weight; 3) measuring fuel consumption of the engine every second for a period of Y seconds and determining an average fuel consumption; 4) repeating steps 1-3 over a total test period; 5) measuring the volume of material excavated from the site over the total test period with use of a GPS image scanning software system; 6) calculating a second work done with use of measurements obtained in step 5) along with a density value of the material; and 7) calculating fuel consumption efficiency based on the sum of the first work done and second work done over the total test period divided by the fuel consumption by the engine over the total test period.

DESCRIPTION OF THE INVENTION

The field testing methods of the present invention are performed on internal combustion engines, such as diesel powered vehicles which utilize both mechanical drive systems and electrical drive systems. In a mechanical drive system, the measurement of one of the parameters for determining work done is accomplished by installing a strain gage on a drive shaft or in the case of a boat, on a propeller shaft of the boat. The "strain" or "flex" of the driveshaft is measured many times each second, and the resulting data is collected and transmitted with use of a rotating transmitter attached to the driveshaft or propeller shaft. A receiver is used to collect the signal from the transmitter transmitting the data from the strain gage. These measurements are averaged over a period of time, preferably one second, and then converted to a torque value each second, for example. Also, an optical sensor is installed on the drive shaft or propeller shaft and the instantaneous RPM (rotation per minute) is measured many times each second and averaged over a period of preferably one second. The torque value data and the RPM data are used to calculate horsepower, also preferably each second.

Fuel consumption data is simultaneously collected from two positive displacement flow meters and averaged each second. Fuel measurement precision is enhanced by temperature measurement of the fuel upon entrance to each flow meter. This measurement is reported to the datalogger, preferably each second. These values are the basis for application of a correction factor (volumetric change/degree Fahrenheit) for differences in fuel temperature at the time of measurement with use of the positive displacement flow meters. The calculation is applied post process with use of a spreadsheet. Shown below in Table 2 are measurements of fuel flow and fuel temperature for use in obtaining the precise fuel usage.

In a diesel engine utilizing an electrical drive system, application of the measurement of work done is carried out by utilizing an electrical power logger. The electrical power logger is connected to wiring of a final drive or drives of the particular vehicle being evaluated. The power data collected at this point is an electric current and electric voltage measurement, which are used to calculate kilowatts (KW) of energy, preferably each second. This data is collected in a datalogger and matched to the fuel consumption data for the same period of time. The efficiency is calculated and expressed as fuel consumption divided by kilowatts.

With both test systems, mechanical and electrical, fuel and emission data are compared to actual work done. Work done can be used to obtain production efficiency (average overall efficiency) for different diesel powered vehicles and their specific applications.

Preparation for the evaluation of exhaust emission involves the installation of a pipe fitting into each of the exhaust stacks if two engines are providing power to a vehicle. It is necessary to insert the pipe fittings at a location that is approximately the same distance downstream from the turbocharger of the diesel engines. The fitting accommodates the insertion of an emission probe into the exhaust stream. Both gaseous and soot/oil trace (particulate matter (PM)) samples are drawn through the probes by an ECOM (Ecom America, Ltd.—Gainesville, Ga.) Model # J2KN s/n 2026-OCNX emission test unit. The gases sampled are CO, $CO_2$, NO, $NO_2$, $NO_x$ and $O_2$. The soot/oil trace (PM) sample is analyzed in two ways, one by a "Dot" method, discussed below, and the other by a tare weight method. The data collected from each exhaust stream, from each of the engines, is recorded. The values from each engine are averaged over a period of time, preferably a one second period and reported.

Following is an example of a test using the method of the present invention.

EXAMPLE 1

The method of the first embodiment of the present invention is demonstrated in the following experiment conducted on a marine vessel. A baseline portion of a comparison test was performed on a tow boat. A description of the study, as well as a presentation of a summary of the data collected, is provided below.

The marine vessel was fully fueled and fully loaded with a 15 barge tow. Each barge was typically loaded with coal at a loading terminal, immediately prior to the test. In a loaded condition, the vessel proceeded upstream until 900 engine RPM (full throttle) and constant vessel speed was achieved. At that time data logging commenced to include sufficient data to analyze recordings made at 1, 5, and 10 minutes from the start of the test. Straight rudder position was used throughout the test. The conditions were easily duplicated for a comparison test.

Twin diesel engines provided the propulsion for the vessel, a starboard engine and a port engine.

The data collected in the test reflected the fuel necessary to generate the horsepower delivered to the propulsion wheels each second. Exhaust emissions, both gaseous and soot/oil trace (PM), were also measured.

In preparation for each test, two AW-Lake (AW-Lake Co.—Franksville, Wis.) positive displacement flow meters, model # JVA-30 KG were installed on each engine (for large engines model # JVA-60 KG is used). One flow meter was installed in the fuel supply line and the other flow meter was installed in the fuel return line to the fuel tank.

The fuel flow data was measured many times each second and averaged for each second in a Monarch (Monarch Instrument,—Amherst, N.H.) Model # DC-6000 Data Chart s/n B6000177 datalogger. The difference between the two sets of data collected each second for the flow meters was processed and stored. The difference represented the fuel consumption, for that second, expressed in gallons per minute (GPM) for each engine.

An independent power source was used to power all the instruments used in the testing. Such independent power eliminated any compromise of data due to electrical power fluctuations supplied to the instruments. A Honda portable gasoline 1000 Watt generator having computer current stabilized/regulated was used.

The preparation for the evaluation of exhaust emissions involved the installation of two pipe fittings, into each of the exhaust stacks. It was necessary to insert the two pipe fittings at a location that was approximately the same distance downstream from each turbocharger of the diesel engines. The fittings accommodated the insertion of emission probes into each exhaust stream. Both gaseous and soot/oil trace (particulate matter) samples were drawn through the probes by an the ECOM Model # J2KN s/n 2026-OCNX emission test unit, mentioned above. The gases sampled were CO, $CO_2$, NO, $NO_2$, $NO_x$ and $O_2$. The soot/oil trace (PM) sample was analyzed in two ways, one by the Dot method and the other by the tare weight method. The data collected from each exhaust stream, from each of the engines, was recorded. The values from each engine were also averaged over a one second period and reported.

The Soot/Oil Trace (PM) analysis was processed by two different methods. Both methods required installation of a sample filter paper in the emission probes for data collection. One method was a "Dot" method. This method utilizes a color comparison utilizing a graydot/Bacharach Test The other method included weighing the filter paper before and after the soot/oil trace (PM) was deposited on it. Special care was taken to stabilize the temperature and moisture content of the samples for weighing. The weighing was carried out by a Mettler-Toledo (Mettler-Toledo, Inc.—Columbus, Ohio) Model # AX205DR s/n 1125442082 Semi-Micro Balance. The difference of the before and after weighing or "Tare", was reported in parts of a gram. This represented the weight of the material deposited on the filter paper when exactly 1.62 liters of exhaust gas was drawn through it, by the ECOM J2KN Emission Analyzer, mentioned above.

Preparation for measuring the work done consisted of installing a Vishay (Vishay Intertechnology, Inc.—Malvern, Pa.) strain gage on each propeller shaft, between the gearbox and the propulsion wheel. A Binsfeld (Binsfeld Engineering, Inc.—Maple City, Mich.) TorqueTrak 10K Torque Telemetry System was utilized to gather and transmit torque data. The information from the strain gage was collected and transmitted via a transmitter which was installed on each propeller shaft. Each transmitter sent respective data on a different frequency and was matched to the frequency of each receiver. The data was displayed and exported to the datalogger, a plurality of times each second. The datalogger averaged and recorded the information each second.

The torque value for a drive shaft or propeller shaft is determined with use of a strain value, obtained with use of the strain gage, and information about the shaft. Having dimensional values of the shaft and knowing the material of the shaft, the torque of the shaft can be calculated with use of the TorqueTrak torque telemetry system, mentioned above. A torque sensitive stain gage and a transmitter are mounted on the shaft of the engine to be tested and measurements of the shaft OD and shaft ID (if hollow shaft) are obtained along with the material of the shaft. A transmission from the transmitter is received by a receiver and input into a computer having the TorqueTrak software for determining the torque of the shaft. It is necessary to input the shaft OD and ID, the modulus of elasticity and Poisson ratio of the material of the shaft and a "gage factor" which is dependent on the particular torque sensitive strain gage mounted on the shaft. The TorqueTrak software reports out the torque each selected period of time, which is exported to the datalogger, where it is matched with RPM data for the same period of time.

For determining the RPM of the shafts Monarch optical sensors (Monarch Instrument, Amherst, N.H.) are installed on each shaft. Shaft RPM is measured by the sensors many times each second and the data is exported to the datalogger where it is averaged and recorded each second.

The torque data and RPM data were merged and processed together in the datalogger to provide the respective horsepower delivered by each shaft each second. The horsepower data each second was then merged with the fuel consumption data for each second, in the datalogger. This provided the "efficiency number" which is expressed in GPM of fuel per horsepower actually delivered to each propulsion wheel of the towboat. The horsepower, fuel consumption, and emission data, for starboard and port propulsion systems, were merged to provide results for the vessel as a whole.

Following in Table 1 is test data and in Table 2 is the test summary. In the test summary, the propeller shaft HP is calculated as propeller shaft torque times propeller shaft RPM divided by 5252. The efficiency is calculated as fuel consumption divided by propeller shaft HP. Values measured include a "current velocity" of the water in the test area which is obtained with use of a float device having a GPS "rover unit" mounted on it. Use of the GPS tracking software used with the device is discussed below. The fuel efficiency is expressed in GPM/HP/1000.

TABLE 1

SAMPLE DATA

| Item Chan Tag Eng. Unit Time | Chan1 Shaft 1 RPM's Chan1 | Chan2 Torque 1 ft./lbs Chan2 | Chan3 Flow 1 GPM's Chan3 | Chan4 Flow 2 GPM's Chan4 | Chan5 F. Temp 1 Deg. F. Chan5 | Chan6 F. Temp 2 Deg. F. Chan6 | Engine 1 H.P. c1*c2/ 5252 MC1 | ENG 1 Fuel in Mod C3*(1 + (75 − F6)*0.00046) MC2 | ENG 1 fuel out E C4*(1 + (75 − F6)*0.00046) MC3 | ENG 1 G.P.M. MOD MC2-MC3 MC4 | E#1 Eff GPM/HP MC4/MC1 MC5 | Chan7 Shaft 2 RPM's Chan7 | Chan8 Torque 2 ft./lbs Chan8 |
|---|---|---|---|---|---|---|---|---|---|---|---|---|---|
| Oct. 06, 2009 1:27:23 PM | 292.7299 | 2209.783 | 0.3647 | 0.28 | 68.3858 | 142.7518 | 123.1663 | 0.365809611 | 0.271273568 | 0.09453604 | 0.000768 | 278.9495 | 1737.907 |
| Oct. 06, 2009 1:27:24 PM | 293.1805 | 2219.464 | 0.3639 | 0.2817 | 68.3858 | 142.6487 | 123.8963 | 0.365007177 | 0.272933946 | 0.09207323 | 0.000743 | 278.9542 | 1739.396 |
| Oct. 06, 2009 1:27:25 PM | 292.6746 | 2217.01 | 0.3669 | 0.2806 | 68.3686 | 142.5114 | 123.5458 | 0.368019208 | 0.271885899 | 0.09613331 | 0.000778 | 279.0376 | 1740.087 |
| Oct. 06, 2009 1:27:26 PM | 292.6463 | 2213.24 | 0.3667 | 0.2853 | 68.3514 | 142.3569 | 123.3238 | 0.367821499 | 0.276460215 | 0.09136128 | 0.000741 | 278.9492 | 1747.84 |
| Oct. 06, 2009 1:27:27 PM | 292.2499 | 2220.409 | 0.3621 | 0.2814 | 68.3514 | 142.1853 | 123.9784 | 0.363195988 | 0.272703266 | 0.09049272 | 0.000730 | 278.8545 | 1746.893 |
| Oct. 06, 2009 1:27:28 PM | 293.493 | 2213.984 | 0.3617 | 0.2815 | 68.3514 | 142.0651 | 123.7222 | 0.362806207 | 0.27281574 | 0.08999047 | 0.000727 | 278.8545 | 1759.83 |
| Oct. 06, 2009 1:27:29 PM | 293.4689 | 2202.042 | 0.3598 | 0.2796 | 68.3858 | 141.9277 | 123.0447 | 0.360894703 | 0.270992027 | 0.08990268 | 0.000731 | 279.0482 | 1767.374 |
| Oct. 06, 2009 1:27:30 PM | 293.6343 | 2180.769 | 0.3571 | 0.276 | 68.3858 | 141.7561 | 121.9247 | 0.358186488 | 0.267524646 | 0.09066184 | 0.000744 | 278.075 | 1762.805 |
| Oct. 06, 2009 1:27:31 PM | 293.8118 | 2170.914 | 0.3549 | 0.2795 | 68.3858 | 141.5329 | 121.4471 | 0.355982603 | 0.270045865 | 0.08503674 | 0.000700 | 278.6231 | 1774.569 |
| Oct. 06, 2009 1:27:32 PM | 293.5699 | 2161.15 | 0.3582 | 0.2745 | 68.3858 | 141.4471 | 120.8013 | 0.359288835 | 0.266109725 | 0.09318011 | 0.000771 | 278.1028 | 1798.334 |
| Oct. 06, 2009 1:27:33 PM | 293.2589 | 2145.458 | 0.3594 | 0.2745 | 68.4544 | 141.2754 | 119.7972 | 0.360482145 | 0.266131405 | 0.09435074 | 0.000788 | 277.5901 | 1805.208 |
| Oct. 06, 2009 1:27:34 PM | 294.13 | 2112.75 | 0.3511 | 0.276 | 68.3686 | 141.2067 | 118.3212 | 0.352171011 | 0.267594397 | 0.08457661 | 0.000715 | 277.2416 | 1817.211 |
| Oct. 06, 2009 1:27:35 PM | 293.8568 | 2090.86 | 0.3488 | 0.2729 | 68.3858 | 140.9664 | 116.9866 | 0.349863995 | 0.264618974 | 0.08524502 | 0.000729 | 276.8552 | 1831.833 |
| Oct. 06, 2009 1:27:36 PM | 294.8255 | 2107.848 | 0.3455 | 0.2727 | 68.3686 | 140.9321 | 117.3258 | 0.346553928 | 0.263653609 | 0.08290032 | 0.000701 | 277.2773 | 1836.375 |
| Oct. 06, 2009 1:27:37 PM | 294.9652 | 2116.599 | 0.3567 | 0.2739 | 68.3514 | 140.9321 | 118.8734 | 0.357790916 | 0.265592951 | 0.09219796 | 0.000776 | 277.5288 | 1829.056 |
| Oct. 06, 2009 1:27:38 PM | 294.4174 | 2101.874 | 0.3536 | 0.2733 | 68.3686 | 140.7089 | 117.8272 | 0.35467026 | 0.265039209 | 0.08963105 | 0.000761 | 277.0381 | 1843.268 |
| Oct. 06, 2009 1:27:39 PM | 294.7032 | 2117.878 | 0.353 | 0.2757 | 68.3858 | 140.6059 | 118.8396 | 0.354076807 | 0.267379729 | 0.08669708 | 0.000730 | 277.4979 | 1829.599 |
| Oct. 06, 2009 1:27:40 PM | 293.886 | 2116.016 | 0.3501 | 0.2719 | 68.3858 | 140.4686 | 118.4395 | 0.35116519 | 0.26371158 | 0.08745361 | 0.000738 | 277.6028 | 1822.579 |
| Oct. 06, 2009 1:27:41 PM | 293.5657 | 2129.621 | 0.355 | 0.2756 | 68.3858 | 140.3656 | 119.0373 | 0.356080099 | 0.267313211 | 0.08876689 | 0.000746 | 277.4984 | 1802.123 |
| Oct. 06, 2009 1:27:42 PM | 293.9699 | 2151.285 | 0.3519 | 0.275 | 68.3858 | 140.3656 | 120.4138 | 0.352970667 | 0.266731252 | 0.08623942 | 0.000716 | 277.9525 | 1797.457 |
| Oct. 06, 2009 1:27:43 PM | 293.3563 | 2126.96 | 0.3531 | 0.2777 | 68.4029 | 140.1768 | 118.8037 | 0.354171541 | 0.269374185 | 0.08479736 | 0.000714 | 278.0536 | 1803.393 |
| Oct. 06, 2009 1:27:44 PM | 294.2607 | 2150.898 | 0.3546 | 0.2765 | 68.3686 | 140.1424 | 120.5112 | 0.355681687 | 0.268214538 | 0.08746715 | 0.000726 | 278.718 | 1797.223 |
| Oct. 06, 2009 1:27:45 PM | 294.4901 | 2136.372 | 0.3501 | 0.2733 | 68.3514 | 140.1596 | 119.7906 | 0.35116519 | 0.265108265 | 0.08605693 | 0.000718 | 278.1348 | 1795.441 |
| Oct. 06, 2009 1:27:46 PM | 293.4724 | 2147.944 | 0.3504 | 0.2752 | 68.3686 | 139.9364 | 120.0233 | 0.351468876 | 0.266979571 | 0.08448930 | 0.000704 | 277.9216 | 1791.481 |
| Oct. 06, 2009 1:27:47 PM | 293.3863 | 2151.864 | 0.3514 | 0.2737 | 68.3686 | 139.8162 | 120.6168 | 0.352471926 | 0.265539511 | 0.08693242 | 0.000721 | 278.2301 | 1791.189 |
| Oct. 06, 2009 1:27:48 PM | 293.8366 | 2138.366 | 0.3569 | 0.2719 | 68.3858 | 139.7132 | 119.8 | 0.35798588 | 0.26458247 | 0.09340363 | 0.000780 | 277.761 | 1785.467 |
| Oct. 06, 2009 1:27:49 PM | 293.3842 | 2140.042 | 0.3527 | 0.2756 | 68.3858 | 140.3656 | 119.9533 | 0.353761971 | 0.268077255 | 0.08568472 | 0.000714 | 277.6721 | 1788.002 |
| Oct. 06, 2009 1:27:50 PM | 294.5626 | 2131.502 | 0.3533 | 0.2763 | 68.4544 | 139.6961 | 119.547 | 0.354377722 | 0.275660834 | 0.07871689 | 0.000658 | 278.2889 | 1801.155 |
| Oct. 06, 2009 1:27:51 PM | 294.8079 | 2139.172 | 0.3516 | 0.2841 | 68.3686 | 139.5759 | 120.0771 | 0.352672536 | 0.265065177 | 0.08680736 | 0.000723 | 278.0981 | 1783.175 |
| Oct. 06, 2009 1:27:52 PM | 294.4442 | 2145.698 | 0.3577 | 0.274 | 68.3686 | 139.5416 | 120.2948 | 0.358788314 | 0.264982576 | 0.09029019 | 0.000751 | 278.3048 | 1785.961 |
| Oct. 06, 2009 1:27:53 PM | 294.0662 | 2139.346 | 0.3533 | 0.4386 | 68.3514 | 139.3871 | 119.7847 | 0.354380517 | 0.267146146 | 0.08723437 | 0.000728 | 278.7017 | 1781.508 |
| Oct. 06, 2009 1:27:54 PM | 294.3461 | 2124.688 | 0.353 | 0.2753 | 68.4029 | 139.3871 | 119.0772 | 0.354071237 | 0.266078726 | 0.08799251 | 0.000739 | 278.3488 | 1799.182 |
| Oct. 06, 2009 1:27:55 PM | 294.9875 | 2131.499 | 0.3549 | 0.2742 | 68.3686 | 139.1639 | 119.7193 | 0.355982603 | 0.267368509 | 0.08861409 | 0.000740 | 278.8341 | 1790.88 |
| Oct. 06, 2009 1:27:56 PM | 294.7929 | 2107.707 | 0.3485 | 0.2755 | 68.3686 | 139.3048 | 118.3048 | 0.349560322 | 0.264459211 | 0.08510111 | 0.000719 | 278.4484 | 1767.095 |
| Oct. 06, 2009 1:27:57 PM | 295.3911 | 2106.724 | 0.3547 | 0.2725 | 68.3686 | 138.9579 | 118.4896 | 0.355779186 | 0.266035804 | 0.08974338 | 0.000757 | 278.4302 | 1783.754 |
| Oct. 06, 2009 1:27:58 PM | 295.0239 | 2116.235 | 0.3518 | 0.2741 | 68.3858 | 138.8549 | 118.8766 | 0.352870363 | 0.264786976 | 0.08808339 | 0.000741 | 278.1023 | 1773.578 |
| Oct. 06, 2009 1:27:59 PM | 295.1302 | 2120.973 | 0.3519 | 0.2728 | 68.3858 | 138.8378 | 119.1857 | 0.352973451 | 0.267506899 | 0.08546655 | 0.000717 | 278.6895 | 1768.191 |
| Oct. 06, 2009 1:28:00 PM | 295.2361 | 2121.509 | 0.3526 | 0.2756 | 68.4201 | 138.8206 | 119.285 | 0.353667233 | 0.269935686 | 0.08373155 | 0.000702 | 278.9382 | 1772.852 |
| Oct. 06, 2009 1:28:01 PM | 295.1634 | 2124.537 | 0.3552 | 0.2781 | 68.4201 | 138.7519 | 119.3994 | 0.356286328 | 0.264217497 | 0.09206883 | 0.000771 | 278.2179 | 1772.684 |
| Oct. 06, 2009 1:28:02 PM | 294.9498 | 2112.338 | 0.3549 | 0.2722 | 68.3858 | 138.7519 | 118.6279 | 0.355979795 | 0.265867643 | 0.09011215 | 0.000760 | 278.8341 | 1774.373 |
| Oct. 06, 2009 1:28:03 PM | 294.9796 | 2115.989 | 0.3474 | 0.2739 | 68.3858 | 138.5287 | 118.8449 | 0.348456976 | 0.268905173 | 0.07955180 | 0.000669 | 279.4397 | 1770.628 |
| Oct. 06, 2009 1:28:04 PM | 295.0032 | 2121.807 | 0.3466 | 0.2809 | 68.3514 | 138.6318 | 119.1812 | 0.347660026 | 0.272677881 | 0.07498215 | 0.000629 | 278.9635 | 1760.562 |

TABLE 1-continued

SAMPLE DATA

| Item Chan Tag Eng. Unit | Chan9 Flow 3 GPM's | Chan10 Flow 4 GPM's | Chan11 F. Temp 3 Deg. F. | Chan12 F. Temp 4 Deg. F. | | | | | | |
|---|---|---|---|---|---|---|---|---|---|---|
| Time | Chan9 | Chan10 | Chan11 | Chan12 | | | | | | |
| Oct. 06, 2009 1:28:05 PM | 295.255 | 2114.467 | | | 138.4944 | 68.4201 | 0.2742 | 0.3523 | 0.353336325 | 0.266191324 | 0.08717500 | 0.000733 |
| Oct. 06, 2009 1:28:06 PM | 295.3777 | 2102.115 | | | 138.4429 | 68.3686 | 0.2733 | 0.3562 | 0.357286568 | 0.265324085 | 0.09196248 | 0.000778 |
| Oct. 06, 2009 1:28:07 PM | 295.646 | 2096.605 | | | 138.4429 | 68.3686 | 0.2698 | 0.349 | 0.350064605 | 0.261926229 | 0.08813838 | 0.000747 |
| Oct. 06, 2009 1:28:08 PM | 295.6004 | 2093.762 | | | 138.3056 | 68.3514 | 0.2725 | 0.3511 | 0.352173789 | 0.263108324 | 0.08906546 | 0.000756 |
| Oct. 06, 2009 1:28:09 PM | 295.3016 | 2111.734 | | | 138.2197 | 68.3343 | 0.2734 | 0.3497 | 0.350772258 | 0.264575411 | 0.08619685 | 0.000726 |
| Oct. 06, 2009 1:28:10 PM | 295.4055 | 2112.357 | | | 138.2541 | 68.4029 | 0.2775 | 0.3568 | 0.357882769 | 0.265444911 | 0.09243786 | 0.000778 |
| Oct. 06, 2009 1:28:11 PM | 295.1382 | 2104.632 | | | 138.3399 | 68.3686 | 0.2757 | 0.3561 | 0.357186263 | 0.269414662 | 0.08777160 | 0.000742 |
| Oct. 06, 2009 1:28:12 PM | 295.4852 | 2080.439 | | | 138.2369 | 68.3636 | 0.2757 | 0.3519 | 0.352973451 | 0.2676801 | 0.08529328 | 0.000729 |
| Oct. 06, 2009 1:28:13 PM | 295.2137 | 2119.889 | | | 138.0996 | 68.3686 | 0.2743 | 0.3514 | 0.352471926 | 0.266338219 | 0.08613371 | 0.000723 |

| | | | | Engine 2 | | ENG 2 | | | Average | | |
|---|---|---|---|---|---|---|---|---|---|---|---|
| | | | | H.P. c7*c8/5252 | | Fuel in Mod C9*(1 + (75 − F6)*0.00046) | fuel out E C10*(1 + (75 − F6)*0.00046) | ENG 2 G.P.M. MOD MC7-MC8 | E#2 Eff GPM/HP MC9/MC6 | EFF (MC5 + MC10)/2 | |
| | | | | MC6 | | MC7 | MC8 | MC9 | MC10 | MC11 | |
| Oct. 06, 2009 1:27:23 PM | 0.2702 | 0.235 | 66.4803 | 137.3443 | 92.30546 | | 0.271258931 | 0.228260581 | 0.04299835 | 0.000466 | 0.00061669 | |
| Oct. 06, 2009 1:27:24 PM | 0.2904 | 0.2416 | 66.6004 | 137.3271 | 92.3861 | | 0.291522052 | 0.234673215 | 0.05684884 | 0.000615 | 0.00067924 | |
| Oct. 06, 2009 1:27:25 PM | 0.2799 | 0.2359 | 66.5661 | 137.3271 | 92.45044 | | 0.280985898 | 0.229136637 | 0.05184926 | 0.000561 | 0.00066948 | |
| Oct. 06, 2009 1:27:26 PM | 0.289 | 0.2425 | 66.5318 | 137.3099 | 92.83293 | | 0.290125763 | 0.235549331 | 0.05457643 | 0.000588 | 0.00066436 | |
| Oct. 06, 2009 1:27:27 PM | 0.2883 | 0.2332 | 66.6691 | 137.3271 | 92.75114 | | 0.289404827 | 0.226514047 | 0.06289078 | 0.000678 | 0.00070398 | |
| Oct. 06, 2009 1:27:28 PM | 0.2809 | 0.2451 | 66.6519 | 137.2928 | 93.42208 | | 0.281978691 | 0.238076736 | 0.04390196 | 0.000470 | 0.00059865 | |
| Oct. 06, 2009 1:27:29 PM | 0.2889 | 0.2274 | 66.6176 | 137.2241 | 93.90376 | | 0.290013971 | 0.22089111 | 0.06912286 | 0.000736 | 0.00073338 | |
| Oct. 06, 2009 1:27:30 PM | 0.2812 | 0.2403 | 66.6176 | 137.2069 | 93.33435 | | 0.28228428 | 0.234323774 | 0.04886051 | 0.000523 | 0.00063354 | |
| Oct. 06, 2009 1:27:31 PM | 0.2881 | 0.2289 | 66.6519 | 137.2413 | 94.14241 | | 0.28920634 | 0.222246365 | 0.06688598 | 0.000710 | 0.00070520 | |
| Oct. 06, 2009 1:27:32 PM | 0.2921 | 0.2512 | 66.6348 | 137.2241 | 95.225 | | 0.293223998 | 0.244009881 | 0.04921412 | 0.000517 | 0.00064408 | |
| Oct. 06, 2009 1:27:33 PM | 0.3009 | 0.2421 | 66.6004 | 137.2413 | 95.41277 | | 0.302062622 | 0.235168435 | 0.06689419 | 0.000701 | 0.00074435 | |
| Oct. 06, 2009 1:27:34 PM | 0.2887 | 0.2513 | 66.6863 | 137.2756 | 95.9266 | | 0.289804076 | 0.244101065 | 0.04570301 | 0.000476 | 0.00059562 | |
| Oct. 06, 2009 1:27:35 PM | 0.2969 | 0.2406 | 66.6519 | 137.1898 | 96.56369 | | 0.298040133 | 0.233717082 | 0.06432305 | 0.000666 | 0.00069740 | |
| Oct. 06, 2009 1:27:36 PM | 0.2967 | 0.2519 | 66.6519 | 137.0696 | 96.9507 | | 0.297839365 | 0.244707747 | 0.05313162 | 0.000548 | 0.00062432 | |
| Oct. 06, 2009 1:27:37 PM | 0.2843 | 0.244 | 66.6519 | 137.2069 | 96.65189 | | 0.285391748 | 0.237017898 | 0.04837385 | 0.000500 | 0.00063805 | |
| Oct. 06, 2009 1:27:38 PM | 0.2902 | 0.2376 | 66.6519 | 137.2069 | 97.23067 | | 0.291314405 | 0.230801035 | 0.06051137 | 0.000622 | 0.00069153 | |
| Oct. 06, 2009 1:27:39 PM | 0.2986 | 0.2433 | 66.6348 | 137.1898 | 96.66982 | | 0.29974901 | 0.236339842 | 0.06340917 | 0.000656 | 0.00069273 | |
| Oct. 06, 2009 1:27:40 PM | 0.2944 | 0.2376 | 66.6863 | 137.1898 | 96.33531 | | 0.295525875 | 0.230802904 | 0.06472297 | 0.000672 | 0.00070512 | |
| Oct. 06, 2009 1:27:41 PM | 0.2926 | 0.2432 | 66.7378 | 137.2069 | 95.21825 | | 0.293712059 | 0.23624079 | 0.05747127 | 0.000604 | 0.00067464 | |
| Oct. 06, 2009 1:27:42 PM | 0.2863 | 0.2343 | 66.6004 | 137.2069 | 95.12713 | | 0.284706211 | 0.227595465 | 0.05981075 | 0.000629 | 0.00067247 | |
| Oct. 06, 2009 1:27:43 PM | 0.291 | 0.2366 | 66.6519 | 137.1726 | 95.47599 | | 0.292117477 | 0.229833383 | 0.06228409 | 0.000652 | 0.00068306 | |
| Oct. 06, 2009 1:27:44 PM | 0.2837 | 0.2294 | 66.5833 | 137.1898 | 95.37669 | | 0.284798396 | 0.222837484 | 0.06196091 | 0.000650 | 0.00068772 | |
| Oct. 06, 2009 1:27:45 PM | 0.2965 | 0.2383 | 66.5661 | 137.2069 | 95.08275 | | 0.2976503 | 0.231481004 | 0.06616930 | 0.000696 | 0.00070715 | |
| Oct. 06, 2009 1:27:46 PM | 0.2863 | 0.2333 | 66.5318 | 137.2241 | 94.80032 | | 0.287415245 | 0.226622234 | 0.06079301 | 0.000641 | 0.00067261 | |
| Oct. 06, 2009 1:27:47 PM | 0.2809 | 0.2458 | 66.6004 | 137.2241 | 94.89008 | | 0.281985346 | 0.238770268 | 0.04321508 | 0.000455 | 0.00058808 | |
| Oct. 06, 2009 1:27:48 PM | 0.2907 | 0.2302 | 66.7549 | 137.0352 | 94.42748 | | 0.291802551 | 0.223630969 | 0.06817158 | 0.000722 | 0.00075080 | |
| Oct. 06, 2009 1:27:49 PM | 0.2912 | 0.2363 | 66.6176 | 137.0181 | 94.53128 | | 0.292322839 | 0.229558757 | 0.06276408 | 0.000664 | 0.00068913 | |
| Oct. 06, 2009 1:27:50 PM | 0.2915 | 0.2247 | 66.6004 | 137.0181 | 95.4382 | | 0.292626302 | 0.218289685 | 0.07432662 | 0.000779 | 0.00071868 | |
| Oct. 06, 2009 1:27:51 PM | 0.2948 | 0.2348 | 66.6348 | 137.0181 | 94.42071 | | 0.295934388 | 0.228101549 | 0.06783284 | 0.000718 | 0.00072067 | |
| Oct. 06, 2009 1:27:52 PM | 0.2861 | 0.232 | 66.6519 | 137.0352 | 94.63852 | | 0.28719866 | 0.225379603 | 0.06181906 | 0.000653 | 000070189 | |
| Oct. 06, 2009 1:27:53 PM | 0.2851 | 0.2348 | 66.5833 | 137.0181 | 94.53719 | | 0.286203817 | 0.228101549 | 0.05810227 | 0.000615 | 0.00067143 | |
| Oct. 06, 2009 1:27:54 PM | 0.2905 | 0.2251 | 66.6176 | 137.1039 | 95.35418 | | 0.29162014 | 0.21866939 | 0.07295075 | 0.000765 | 0.00075200 | |
| Oct. 06, 2009 1:27:55 PM | 0.2765 | 0.2375 | 66.6863 | 137.0524 | 95.07967 | | 0.27755742 | 0.230720775 | 0.04683664 | 0.000493 | 0.00061639 | |

| | | | | | | | | | | | |
|---|---|---|---|---|---|---|---|---|---|---|---|
| | | | | | | | | | | | 1754.526 |
| | | | | | | | | | 279.3546 | | 1755.547 |
| | | | | | | | | | 279.2841 | | 1749.967 |
| | | | | | | | | | 279.1276 | | 1754.635 |
| | | | | | | | | | 279.5825 | | 1760.735 |
| | | | | | | | | | 279.575 | | 1750.83 |
| | | | | | | | | | 279.4342 | | 1745.327 |
| | | | | | | | | | 279.3136 | | 1740.968 |
| | | | | | | | | | 279.5515 | | 1738.198 |
| | | | | | | | | | 278.8739 | | |

GPS Data

| Pt# | Northing (ft) | |
|---|---|---|
| 1219 | 332875.7982 | |
| 1220 | 332873.9212 | |
| 1221 | 332872.0289 | |
| 1222 | 332870.1992 | |
| 1223 | 332868.3712 | |
| 1224 | 332866.526 | |
| 1225 | 332864.7166 | |
| 1226 | 332862.8646 | |
| 1227 | 332860.993 | |
| 1228 | 332859.0173 | |
| 1229 | 332856.9675 | |
| 1230 | 332854.8757 | |
| 1231 | 332852.7562 | |
| 1232 | 332850.5719 | |
| 1233 | 332848.3026 | |
| 1234 | 332846 | |
| 1235 | 332893.699 | |
| 1236 | 332841.3709 | |
| 1237 | 332838.9977 | |
| 1238 | 332836.6217 | |
| 1239 | 332834.2395 | |
| 1240 | 332831.8323 | |
| 1241 | 332829.4097 | |
| 1242 | 332826.968 | |
| 1243 | 332824.5052 | |
| 1244 | 332822.0284 | |
| 1245 | 332819.5075 | |
| 1246 | 332816.9908 | |
| 1247 | 332814.4186 | |
| 1248 | 332811.7937 | |
| 1249 | 332809.1509 | |
| 1250 | 332806.5139 | |
| 1251 | 332803.8272 | |

TABLE 1-continued

SAMPLE DATA

| Time | | | | | | | | | | |
|---|---|---|---|---|---|---|---|---|---|---|
| Oct. 06, 2009 1:27:56 PM | 0.285 | 0.2302 | 66.6519 | 137.1898 | 93.68712 | 0.286094436 | 0.223614598 | 0.06247984 | 0.000667 | 0.00069312 | 332801.0979 | 1252 |
| Oct. 06, 2009 1:27:57 PM | 0.2728 | 0.2379 | 66.6519 | 137.0352 | 94.56416 | 0.273847586 | 0.23111124 | 0.04273635 | 0.000452 | 0.00060466 | 332798.3279 | 1253 |
| Oct. 06, 2009 1:27:58 PM | 0.2854 | 0.2304 | 66.6691 | 137.0352 | 93.91396 | 0.286493714 | 0.223825261 | 0.06266845 | 0.000667 | 0.00070413 | 332795.4828 | 1254 |
| Oct. 06, 2009 1:27:59 PM | 0.2896 | 0.2408 | 66.7206 | 137.0696 | 93.8264 | 0.290702949 | 0.223924675 | 0.05677827 | 0.000605 | 0.00066111 | 332792.6167 | 1255 |
| Oct. 06, 2009 1:28:00 PM | 0.2781 | 0.2372 | 66.5833 | 137.0696 | 94.15768 | 0.279176715 | 0.230427462 | 0.04874925 | 0.000518 | 0.00060984 | 332789.6435 | 1256 |
| Oct. 06, 2009 1:28:01 PM | 0.2762 | 0.2392 | 66.6519 | 137.0867 | 93.90564 | 0.277260643 | 0.232368476 | 0.04489217 | 0.000478 | 0.00062458 | 332786.6968 | 1257 |
| Oct. 06, 2009 1:28:02 PM | 0.286 | 0.2337 | 66.7378 | 137.1039 | 94.29421 | 0.287086975 | 0.227023707 | 0.06006327 | 0.000637 | 0.00069830 | 332783.7412 | 1258 |
| Oct. 06, 2009 1:28:03 PM | 0.284 | 0.2403 | 66.7893 | 137.0696 | 94.20864 | 0.285072646 | 0.233438951 | 0.05163370 | 0.000548 | 0.00060873 | 332780.7984 | 1259 |
| Oct. 06, 2009 1:28:04 PM | 0.2908 | 0.2353 | 66.6691 | 137.0352 | 93.51343 | 0.291914408 | 0.228855434 | 0.06312897 | 0.000677 | 0.00065318 | 332777.8097 | 1260 |
| Oct. 06, 2009 1:28:05 PM | 0.3004 | 0.2385 | 66.6348 | 137.0352 | 93.32348 | 0.301555937 | 0.231694118 | 0.06986182 | 0.000749 | 0.00074098 | 332774.7707 | 1261 |
| Oct. 06, 2009 1:28:06 PM | 0.2817 | 0.2485 | 66.7893 | 136.8979 | 93.35422 | 0.282763959 | 0.241424451 | 0.04133951 | 0.000443 | 0.00061034 | 332771.738 | 1262 |
| Oct. 06, 2009 1:28:07 PM | 0.286 | 0.2407 | 66.6691 | 136.9151 | 93.00535 | 0.287096013 | 0.233844636 | 0.05325138 | 0.000573 | 0.00065968 | 332768.6724 | 1263 |
| Oct. 06, 2009 1:28:08 PM | 0.2794 | 0.2458 | 66.8064 | 136.8979 | 93.40542 | 0.280453074 | 0.238801328 | 0.04165175 | 0.000446 | 0.00060086 | 332765.5685 | 1264 |
| Oct. 06, 2009 1:28:09 PM | 0.2821 | 0.2395 | 66.7206 | 136.8979 | 93.72763 | 0.283174385 | 0.232680708 | 0.05049368 | 0.000539 | 0.00063234 | 332762.4885 | 1265 |
| Oct. 06, 2009 1:28:10 PM | 0.2841 | 0.2402 | 66.7893 | 136.8979 | 93.15342 | 0.285173024 | 0.233360777 | 0.05181225 | 0.000556 | 0.00066711 | 332759.3447 | 1266 |
| Oct. 06, 2009 1:28:11 PM | 0.2841 | 0.2335 | 66.7378 | 136.7778 | 92.82056 | 0.285179754 | 0.226864447 | 0.05831531 | 0.000628 | 0.00068519 | 332756.1819 | 1267 |
| Oct. 06, 2009 1:28:12 PM | 0.2837 | 0.2366 | 66.6519 | 136.7606 | 92.6676 | 0.284789444 | 0.229878223 | 0.05491122 | 0.000593 | 0.00066063 | 332753.0314 | 1268 |
| Oct. 06, 2009 1:28:13 PM | 0.2731 | 0.2324 | 66.7721 | 136.7606 | 92.2959 | 0.274133638 | 0.225797545 | 0.04833609 | 0.000524 | 0.00062328 | 332749.8382 | 1269 |

| Item | GPS Data | | | North Bearing River | | | Current Speed 0.84 MPH | | | Data Sets Average Overall | | |
|---|---|---|---|---|---|---|---|---|---|---|---|---|
| Chan Tag Eng. Unit | Easting (ft) | Elevation (ft) | Heading (Bearing) | Distance (ft/sec) | Speed (MPH) | Corrected Speed (MPH) | Count | Efficiency 600 sec Sample MC11 | Distance Traveled 600 sec Sample MC16 | Average Speed 600 Sec Sample MPH |
| Time | | | MC12 | MC13 | MC14 | | | | | |
| Oct. 06, 2009 1:27:23 PM | 1348612.173 | 758.187 | 167.254 | 1.924426 | 1.31 | 0.47 | 1 | 0.0007311 | 3748.8747715 | 4.260084968 |
| Oct. 06, 2009 1:27:24 PM | 1348612.597 | 758.1623 | 163.481 | 1.973764 | 1.35 | 0.51 | 2 | 0.0007314 | 3753.9118537 | 4.265808925 |
| Oct. 06, 2009 1:27:25 PM | 1348613.158 | 758.1812 | 160.19 | 1.944792 | 1.33 | 0.49 | 4 | 0.0007319 | 3758.8847757 | 4.271425881 |
| Oct. 06, 2009 1:27:26 PM | 1348613.818 | 758.1915 | 157.733 | 1.975307 | 1.35 | 0.51 | 3 | 0.0007319 | 3763.8273784 | 4.277076566 |
| Oct. 06, 2009 1:27:27 PM | 1348614.566 | 758.2096 | 155.487 | 2.027983 | 1.38 | 0.54 | 5 | 0.0007319 | 3768.7880402 | 4.282713682 |
| Oct. 06, 2009 1:27:28 PM | 1348615.407 | 758.2423 | 153.149 | 2.028049 | 1.38 | 0.54 | 6 | 0.0007321 | 3773.6581549 | 4.288247903 |
| Oct. 06, 2009 1:27:29 PM | 1348616.323 | 758.2613 | 151.801 | 2.101417 | 1.43 | 0.59 | 7 | 0.0007323 | 3778.5349375 | 4.293812429 |
| Oct. 06, 2009 1:27:30 PM | 1348617.316 | 758.2395 | 151.968 | 2.120353 | 1.45 | 0.61 | 8 | 0.0007324 | 3783.3252726 | 4.299233264 |
| Oct. 06, 2009 1:27:31 PM | 1348616.313 | 758.2469 | 153.108 | 2.215264 | 1.51 | 0.67 | 9 | 0.0007326 | 3788.1619507 | 4.304729489 |
| Oct. 06, 2009 1:27:32 PM | 1348619.315 | 758.2335 | 154.311 | 2.274616 | 1.55 | 0.71 | 10 | 0.0007327 | 3792.8902823 | 4.310102594 |
| Oct. 06, 2009 1:27:33 PM | 1348620.301 | 758.2407 | 155.271 | 2.302991 | 1.57 | 0.73 | 11 | 0.0007328 | 3797.5828625 | 4.315435071 |
| Oct. 06, 2009 1:27:34 PM | 1648621.264 | 758.2391 | 155.898 | 2.321931 | 1.58 | 0.74 | 12 | 0.0007329 | 3802.2535492 | 4.32074267 |
| Oct. 06, 2009 1:27:35 PM | 1348622.213 | 758.2183 | 156.568 | 2.380632 | 1.62 | 0.78 | 13 | 0.0007331 | 3806.9131100 | 4.326037625 |
| Oct. 06, 2009 1:27:36 PM | 1348623.159 | 758.2075 | 157.018 | 2.464941 | 1.68 | 0.84 | 14 | 0.0007337 | 3811.4502535 | 4.33119347 |
| Oct. 06, 2009 1:27:37 PM | 1348624.122 | 758.2098 | 156.926 | 2.502825 | 1.71 | 0.87 | 15 | 0.0007338 | 3815.8427721 | 4.336184968 |
| Oct. 06, 2009 1:27:38 PM | 1348625.103 | 758.2026 | 156.141 | 2.521474 | 1.72 | 0.88 | 16 | 0.0007340 | 3820.3178955 | 4.341270336 |
| Oct. 06, 2009 1:27:39 PM | 1348626.122 | 758.1946 | 155.162 | 2.559895 | 1.75 | 0.91 | 18 | 0.0007340 | 3824.6726621 | 4.346218934 |
| Oct. 06, 2009 1:27:40 PM | 1348627.198 | 758.2187 | 155.162 | 2.559895 | 1.75 | 0.91 | 20 | 0.0007341 | 3828.9667185 | 4.351098544 |
| Oct. 06, 2009 1:27:41 PM | 1348628.34 | 758.195 | 154.289 | 2.633978 | 1.80 | 0.96 | 17 | 0.0007340 | 3833.2879892 | 4.356009079 |
| Oct. 06, 2009 1:27:42 PM | 1348629.523 | 758.1951 | 153.543 | 2.653949 | 1.81 | 0.97 | 19 | 0.0007341 | 3837.5751028 | 4.360880799 |

TABLE 1-continued

SAMPLE DATA

| | | | | | | | | |
|---|---|---|---|---|---|---|---|---|
| Oct. 06, 2009 1:27:43 PM | 1348630.758 | 758.2103 | 152.593 | 2.683393 | 1.83 | 0.99 | 21 | 0.0007342 | 3841.8875003 | 4.36578125 |
| Oct. 06, 2009 1:27:44 PM | 1348632.064 | 758.205 | 151.513 | 2.738801 | 1.87 | 1.03 | 22 | 0.0007344 | 3846.071739 | 4.370536067 |
| Oct. 06, 2009 1:27:45 PM | 1348633.438 | 758.2038 | 150.449 | 2.784869 | 1.90 | 1.06 | 23 | 0.0007346 | 3850.1521491 | 4.375172897 |
| Oct. 06, 2009 1:27:46 PM | 1348634.849 | 758.2157 | 149.981 | 2.819974 | 1.92 | 1.08 | 24 | 0.0007347 | 3854.2481868 | 4.379827485 |
| Oct. 06, 2009 1:27:47 PM | 1348636.288 | 758.2014 | 149.701 | 2.852436 | 1.94 | 1.10 | 25 | 0.0007348 | 3858.3273867 | 4.384462939 |
| Oct. 06, 2009 1:27:48 PM | 1348637.778 | 758.2317 | 148.971 | 2.890388 | 1.97 | 1.13 | 26 | 0.0007351 | 3862.3767908 | 4.389064535 |
| Oct. 06, 2009 1:27:49 PM | 1348639.341 | 758.235 | 148.192 | 2.96639 | 2.02 | 1.18 | 27 | 0.0007351 | 3866.3169310 | 4.393541967 |
| Oct. 06, 2009 1:27:50 PM | 1348640.931 | 758.2442 | 147.711 | 2.977051 | 2.03 | 1.19 | 28 | 0.0007351 | 3870.2157576 | 4.397972452 |
| Oct. 06, 2009 1:27:51 PM | 1348642.55 | 758.2287 | 147.827 | 3.038826 | 2.07 | 1.23 | 30 | 0.0007353 | 3874.1460754 | 4.402438722 |
| Oct. 06, 2009 1:27:52 PM | 1348644.186 | 758.2111 | 148.062 | 3.09315 | 2.11 | 1.27 | 31 | 0.0007353 | 3877.9641223 | 4.406777412 |
| Oct. 06, 2009 1:27:53 PM | 1348645.839 | 758.1837 | 147.98 | 3.117019 | 2.13 | 1.29 | 29 | 0.0007352 | 3881.7874878 | 4.411122145 |
| Oct. 06, 2009 1:27:54 PM | 1348647.494 | 758.1907 | 147.883 | 3.113485 | 2.12 | 1.28 | 33 | 0.0007353 | 3885.5654755 | 4.415415313 |
| Oct. 06, 2009 1:27:55 PM | 1348649.185 | 758.2009 | 147.812 | 3.174614 | 2.16 | 1.32 | 32 | 0.0007353 | 3889.2557948 | 4.419608858 |
| Oct. 06, 2009 1:27:56 PM | 1348650.886 | 758.2074 | 148.07 | 3.215867 | 2.19 | 1.35 | 34 | 0.0007355 | 3893.0424787 | 4.423911908 |
| Oct. 06, 2009 1:27:57 PM | 1338652.576 | 758.214 | 148.602 | 3.245207 | 2.21 | 1.37 | 35 | 0.0007355 | 3896.6708008 | 4.428035001 |
| Oct. 06, 2009 1:27:58 PM | 1348654.289 | 758.2363 | 148.953 | 3.320834 | 2.26 | 1.42 | 37 | 0.0007359 | 3900.2459546 | 4.432097676 |
| Oct. 06, 2009 1:27:59 PM | 1348655.986 | 758.2436 | 149.375 | 3.330664 | 2.27 | 1.43 | 36 | 0.0007359 | 3903.8661803 | 4.436211569 |
| Oct. 06, 2009 1:28:00 PM | 1348657.718 | 758.2485 | 149.772 | 3.441094 | 2.35 | 1.51 | 38 | 0.0007359 | 3907.3074664 | 4.440122121 |
| Oct. 06, 2009 1:28:01 PM | 1348659.426 | 758.2574 | 149.899 | 3.406022 | 2.32 | 1.48 | 39 | 0.0007362 | 3910.7799924 | 4.444068173 |
| Oct. 06, 2009 1:28:02 PM | 1348661.174 | 758.2631 | 149.412 | 3.433355 | 2.34 | 1.50 | 40 | 0.0007365 | 3914.1773586 | 4.447928817 |
| Oct. 06, 2009 1:28:03 PM | 1348662.962 | 758.2498 | 148.714 | 3.443558 | 2.35 | 1.51 | 41 | 0.0007365 | 3917.6332495 | 4.451855965 |
| Oct. 06, 2009 1:28:04 PM | 1348664.813 | 758.2434 | 148.23 | 3.515417 | 2.40 | 1.56 | 42 | 0.0007367 | 3921.0489387 | 4.45573743 |
| Oct. 06, 2009 1:28:05 PM | 1348666.707 | 758.2353 | 148.069 | 3.580835 | 2.44 | 1.60 | 43 | 0.0007369 | 3924.3649642 | 4.459505641 |
| Oct. 06, 2009 1:28:06 PM | 1348668.601 | 758.244 | 148.016 | 3.57549 | 2.44 | 1.60 | 44 | 0.0007369 | 3927.6993183 | 4.46329468 |
| Oct. 06, 2009 1:28:07 PM | 1348670.528 | 758.2238 | 147.836 | 3.621369 | 2.47 | 1.63 | 45 | 0.0007371 | 3931.0283938 | 4.46707772 |
| Oct. 06, 2009 1:28:08 PM | 1348672.511 | 758.2177 | 147.428 | 3.683217 | 2.51 | 1.67 | 46 | 0.0007373 | 3934.1711502 | 4.470649034 |
| Oct. 06, 2009 1:28:09 PM | 1348674.487 | 758.2179 | 147.32 | 3.65926 | 2.49 | 1.65 | 47 | 0.0007376 | 3937.3448595 | 4.474255522 |
| Oct. 06, 2009 1:28:10 PM | 1348676.495 | 758.2179 | 147.429 | 3.730516 | 2.54 | 1.70 | 48 | 0.0007377 | 3940.5227379 | 4.477866748 |
| Oct. 06, 2009 1:28:11 PM | 1348678.527 | 758.1922 | 147.279 | 3.759353 | 2.56 | 1.72 | 49 | 0.0007378 | 3943.6256411 | 4.481392774 |
| Oct. 06, 2009 1:28:12 PM | 1348680.59 | 758.1871 | 146.783 | 3.765849 | 2.57 | 1.73 | 50 | 0.0007379 | 3946.7005753 | 4.484887017 |
| Oct. 06, 2009 1:28:13 PM | 1348682.695 | 758.207 | 146.607 | 3.824598 | 2.61 | 1.77 | 51 | 0.0007380 | 3949.7589013 | 4.488362388 |

TABLE 2

|  | Prop Shaft RPM (Ave.) | Prop Shaft Torque ft.lbs. (Ave.) | Prop Shaft HP (Ave.) | Fuel Flow (Supply) | Fuel Temp. (Supply) | Fuel Flow (Return) |
| --- | --- | --- | --- | --- | --- | --- |
| Starboard Baseline | 297.44 | 1,968.15 | 111.46 | 0.33 | 69.11 | 0.26 |
| Starboard Comparison | 297.15 | 1962.76 | 111.04 | 0.33 | 68.53 | 0.26 |
| Starboard Difference | −0.29 | −5.39 | −0.43 | | | |
| Port Baseline | 326.44 | 2136.15 | 132.94 | 0.38 | 67.46 | 0.29 |
| Port Comparison | 306.84 | 2072.18 | 121.35 | 0.36 | 67.05 | 0.28 |
| Port Difference | −19.60 | −63.97 | −11.60 | | | |
| Vessel Baseline | 311.94 | 4,104.30 | 244.4007 | 0.7097297 | 68.283827 | 0.547697 |
| Vessel Comparison | 302.00 | 4,034.93 | 232.3807 | 0.694385 | 67.793334 | 0.5409377 |
| Vessel Difference | −9.94 | −69.37 | −12.02 | | | |
| % Change | −3.19% | −1.69% | −4.92% | | | |

|  | Fuel Temp. (Return) | EGT deg. F. | Dot Test # | Soot/Oil (PM) Tare Weight grams | $O_{2\%}$ | $CO_{ppm}$ |
| --- | --- | --- | --- | --- | --- | --- |
| Starboard Base Line | 136.61 | 683 | 9 | 0.00125 | 13.1 | 65 |
| Starboard Comparison | 136.40 | 735 | 7 | 0.00113 | 12.7 | 123 |
| Starboard Difference | | 52.00 | −2.00 | 0.00 | −0.40 | 58.00 |
| Port Baseline | 134.97 | 693 | 9 | 0.00127 | 13.2 | 70 |
| Port Comparison | 135.02 | 700 | 7 | 0.00112 | 12.5 | 149 |
| Port Difference | | 7.00 | −2.00 | 0.00 | −0.70 | 79.00 |
| Vessel Baseline | 135.78725 | 688 | 9 | 0.00252 | 13.15 | 67.5 |
| Vessel Comparison | 135.70777 | 717.5 | 7 | 0.00225 | 12.6 | 136 |
| Vessel Difference | | 29.50 | −2.00 | 0.00 | −0.55 | 68.50 |
| % Change | | 4.29% | −22.22% | −10.71% | −4.18% | 101.48% |

|  | $CO_{2\%}$ | $NO_{ppm}$ | $NO_{2\,ppm}$ | $NOx_{ppm}$ | $NOx_{ppm}$ (Corrected) | Fuel Consumption temperature corrected gal/min (Ave.) |
| --- | --- | --- | --- | --- | --- | --- |
| Starboard Base Line | 5.8 | 2 | 68.0112 | 72.17 | 1.01 | 0.07898545 |
| Starboard Comparison | 6.1 | 400 | 1 | 401 | 426.13 | 0.079271124 |
| Starboard Difference | 0.30 | 398.00 | −67.01 | 328.83 | 425.12 | 0.0002857 |
| Port Baseline | 5.7 | 0 | 0 | 0 | 0.00 | 0.100562124 |
| Port Comparison | 6.2 | 352 | 2 | 354 | 376.32 | 0.091584063 |
| Port Difference | 0.50 | 352.00 | 2.00 | 354.00 | 376.32 | −0.0089781 |
| Vessel Baseline | 5.75 | 1 | 34.0056 | 36.085 | 0.50 | 0.179547574 |
| Vessel Comparison | 6.15 | 376 | 1.5 | 377.5 | 401.23 | 0.170855187 |
| Vessel Difference | 0.40 | 375.00 | −32.51 | 341.42 | 400.77 | −0.0086924 |
| % Change | 6.96% | 37500.00% | −95.59% | 946.14% | 79718.37% | −4.84% |

|  | Fuel Efficiency gpm/hp/1000 | Vessel Velocity ft./min. (ave.) | Current Velocity ft./min. (ave.) | True Velocity ft./min. (ave.) | Pay Load (tons) | Production Efficiency tons/ft. per min./ fuel cons. gpm |
| --- | --- | --- | --- | --- | --- | --- |
| Starboard Base Line | 0.70864081 | 8.070 | 1.232 | 6.838 | 52 | 929.03 |
| Starboard Comparison | 0.71392604 | 7.501 | 1.232 | 6.269 | 55 | 971.84 |
| Starboard Difference | 0.0052852 | | | | | 42.81 |
| Port Baseline | 0.75644596 | 8.070 | 1.232 | 6.838 | 52 | 683.58 |
| Port Comparison | 0.75473986 | 7.501 | 1.232 | 6.269 | 55 | 795.69 |
| Port Difference | −0.0017061 | | | | | 112.11 |
| Vessel Baseline | 0.73254339 | 8.0702553 | 1.232 | 6.838255298 | 52 | 806.3066711 |
| Vessel Comparison | 0.73433295 | 7.5010214 | 1.232 | 6.26902136 | 55 | 883.7661083 |
| Vessel Difference | 0.0017896 | | | | | 77.46 |
| % Change | 0.24% | | | | | 9.61% |

Following the determination of the baseline efficiency, any modification to the engine, fuel etc. can be made, and then the same efficiency test is carried out again. With use of the present method, because of its accuracy, any improvement in efficiency or decrease in efficiency can accurately be determined.

For an electric motor drive system, Voltage is substituted for propeller shaft RPM, Amperage is substituted for propeller shaft torque and kilowatts (KW) is calculated and substituted for propeller shaft HP. The efficiency is calculated and expressed as fuel consumption divided by kilowatts (KW).

Other embodiments of the invention measures work done in relation to fuel consumption in a manner different from the embodiment described above. It can be used in addition to available power tests. Applications are found for this embodiment when there is not a practical means for collecting mechanical data such as strain in a drive shaft. Measuring torque and RPM of a drive shaft, as used in the first embodiment, is often difficult or impossible because of the arrangement of the diesel engine and other drive components of the vehicle or machinery to be evaluated. For example, earth moving equipment may not have a drive shaft suitable for mounting a strain gauge. Therefore, in the second embodiment, productivity (work done) is measured in a different manner as there is not a practical means of collecting torque and RPM of a drive shaft for calculating horsepower. The basis for comparison therefore does not include power. In these cases productivity (work done) is measured.

The recent development of Global Positioning Satellite (GPS) based positioning and tracking systems and Digital Imaging Scanning (IS) systems has enabled precision in collecting data for calculating work done.

Use of a GPS based positioning and tracking system provides an accurate means for documenting movement of a vehicle during a fuel efficiency test. This information can provide vehicle speed, changes in elevation and direction of movement each selected time period. In the GPS system used in the present work, the vehicle position measurements have an accuracy of about one half an inch on X, Y and Z axes. The vehicle speed, changes in elevation and direction of movement are collected every second, for example, for a total test period and time stamped on a "real time" basis. Fuel consumption data is likewise collected as described above in describing the first embodiment of the invention.

An IS (Imaging Scanning) system is used to accurately scan an area, such as a site to be excavated, and measure volumetric changes of the site beginning at a period before material has been moved, at the beginning of the test, and ending at the conclusion of the test. A series of reference points around the test area is established to insure accuracy and repeatability.

The combination of the GPS and IS technologies provides an accurate means of measuring productivity (work done) of a mobile vehicle (construction equipment, mining machinery or the like) by accurately measuring the volume of material that has been moved, the distance it has been moved and the elevation it has been moved. This data is combined with a density of the material and then merged with the fuel consumption data to generate a fuel efficiency value. This method provides an accurate basis for comparison between a baseline and comparison tests made after fuel efficiency changes are performed on the diesel engines(s).

With the use of GPS tracking software (Carlson Model IS-05 . . . . Image Scanning Reflectorless Robotic Total Station utilizing Carlson Software: Top SURV (ver. 7.5) complete with Image Master Software Package—Topcon Positioning Systems Inc.—Livermore, Calif.) the vehicle speed, direction of movement and elevation change can be determined in order to calculate the work done by the vehicle when the vehicle has a fixed load. This method can be applied to mobile vehicles where a known load is carried by an off highway mining truck, for example, or the load is carried by a towed device attached to the vehicle. Efficiencies of fuel consumption and emissions can be calculated and reported relative to "productivity" or "work done" on a "real time" basis. In use of the GPS tracking software, a GPS "rover unit" is mounted on the vehicle and a GPS "base unit" is located near the test site to communicate with the GPS rover unit and a satellite system in orbit. During the test period, data regarding the vehicles movement, including the vehicle speed, direction of movement and elevation change, is recorded each second, for example, for later entry into the GPS tracking software, mentioned above, for determining the work done by the vehicle.

When a load in the vehicle varies while work is being done, GPS tracking of the vehicle for speed, direction of movement and elevation change is used in combination with IS image scanning technology to record actual work done. This method can be applied to mobile vehicles where the load is not constant or the load is not contained in the vehicle, for example a load being pushed by a bulldozer. To determine the work done, a digital image scan (IS) of the test site surface is performed before and after the test session. The quantity of material moved, during the test session is calculated with the use of IS software (Carlson Model GR-3 or Model Hiper GA . . . RTK Positioning System utilizing Carlson Software: Top SURV (version. 7.5), SURV CE (version. 2.4.3), and/or Pocket 3D (version. 8.06)—Carlson Software, Maysville, Ky.). The quantity of material moved is merged with the GPS tracking data (vehicle speed, direction of movement and elevation change collected during the same period. This combination, along with a density of the material to determine a weight of the material moved, represents the "productivity" or "work done". Efficiencies of fuel consumption and emissions can be calculated and reported relative to "productivity" or "work done" on a "real time" basis.

The invention claimed is:

1. A method for determining efficiency of fuel consumption in an internal combustion engine powered vehicle, during operation of the vehicle within a site to excavate material from the site, wherein the vehicle has a base weight and material from the site loaded and unloaded on the vehicle varies a gross weight and resistive load of the vehicle, the method comprising:
   1) measuring the vehicle's speed, direction of movement and elevation change every X second for a period of Y seconds during the operation of the vehicle, with use of a GPS tracking software system;
   2) calculating a first work done with use of measurements obtained in step 1) and the vehicle's base weight;
   3) measuring fuel consumption of the engine every second for a period of Y seconds during the operation of the vehicle and determining an average fuel consumption;
   4) repeating steps 1-3 over a total test period;
   5) measuring a volume of material excavated from the site over the total test period with use of a GPS image scanning software system, wherein a three-dimensional image of the site is obtained at the beginning of the test period, a three-dimensional image of the site is obtained at the conclusion of the test period and a volumetric change of the site is determined;
   6) calculating a second work done with use of the volumetric change obtained in step 5) along with a density value of the material of the site; and
   7) calculating fuel consumption efficiency based on a sum of the first work done and second work done over the total test period divided by the fuel consumption by the engine over the total test period.

2. The method of claim 1, further comprising:
   measuring exhaust emission each X second over the Y seconds.

3. The method of claim 1, further comprising:
   measuring fuel consumption of the engine with use of a first positive displacement flow meter in a fuel supply line from a fuel tank to the engine and a second positive displacement flow meter in a fuel return line carrying unused fuel back to the fuel tank and calculating the quantity of fuel consumed by the engine, and
   adjusting the resulting quantity of fuel consumed by the engine for differences in a density of the fuel resulting from any differences in temperature of the fuel at the first and second positive displacement flow meters.

4. The method of claim 1, wherein X has a value of 0.05 and Y has a value of 1.0.

* * * * *